UNITED STATES PATENT OFFICE.

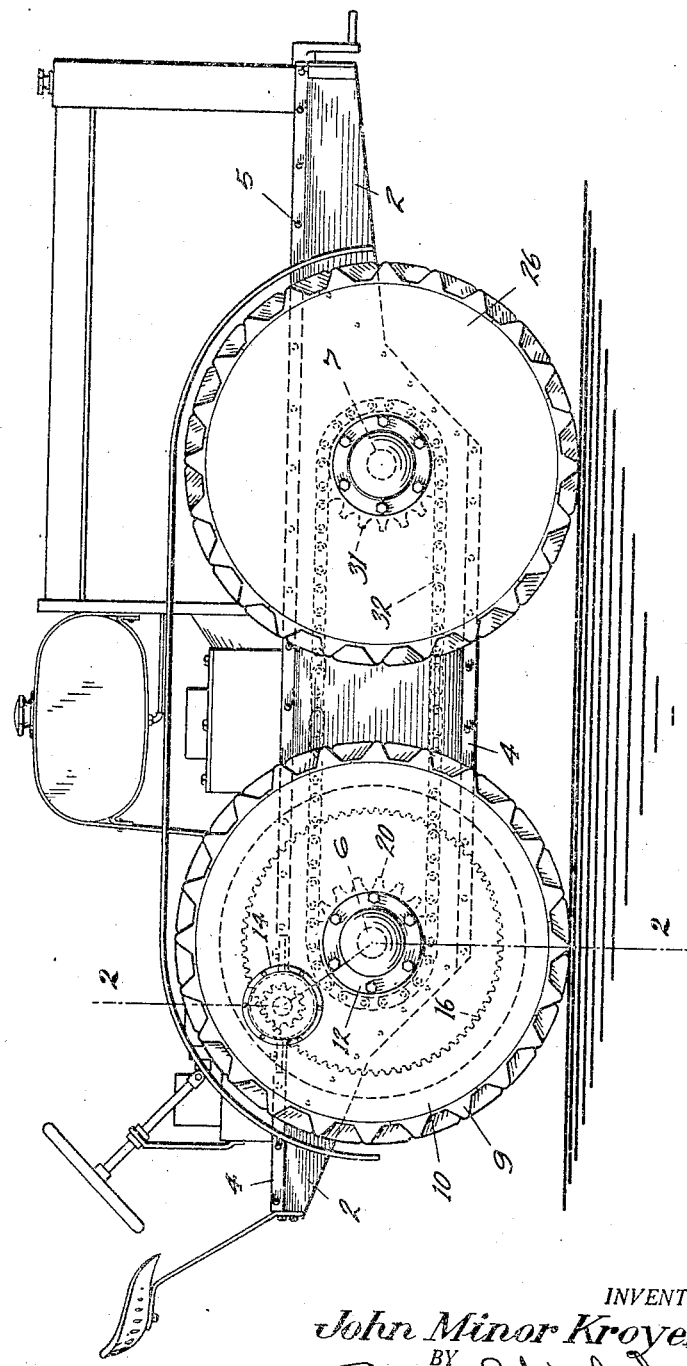

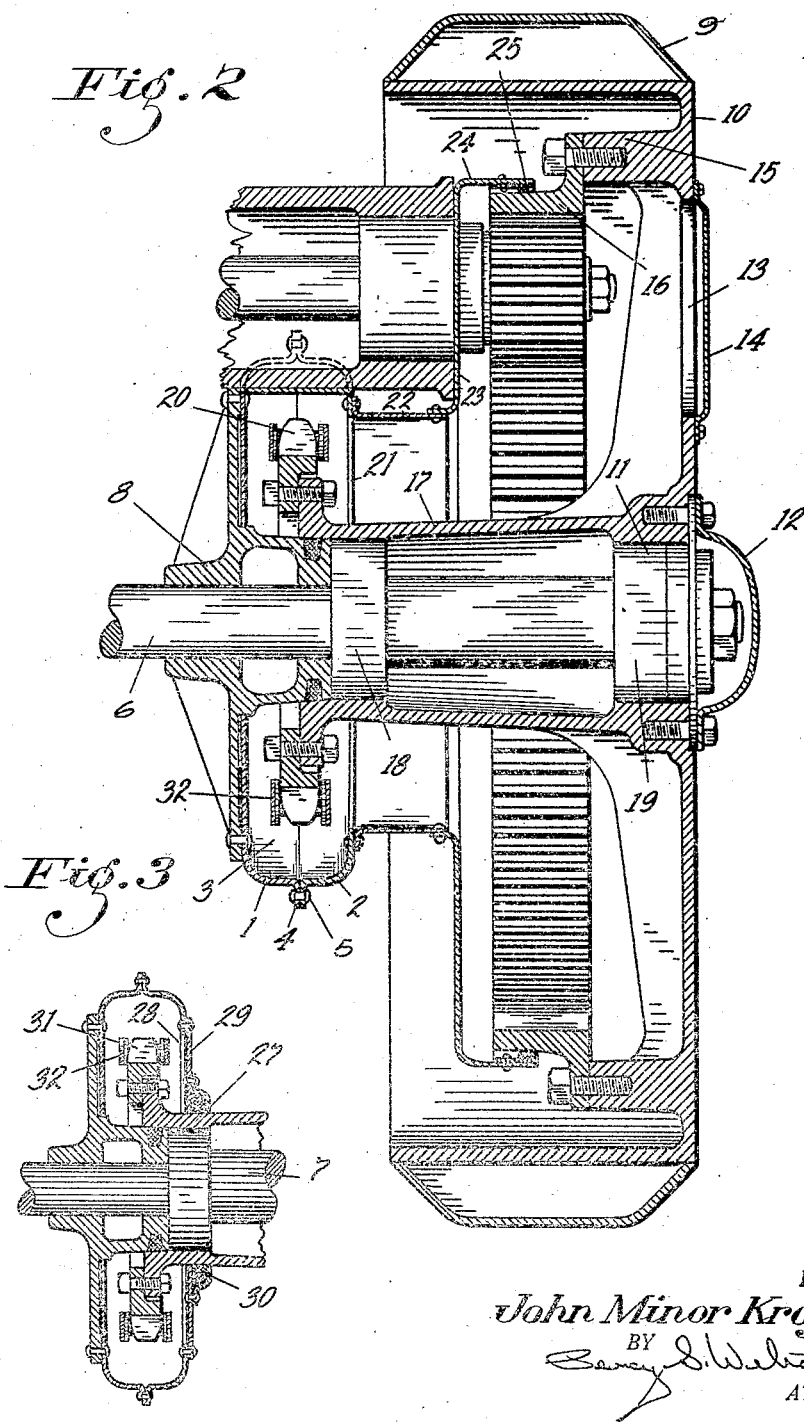

JOHN MINOR KROYER, OF STOCKTON, CALIFORNIA.

COMBINATION TRACTOR FRAME AND TRANSMISSION-HOUSING.

1,307,555.

Specification of Letters Patent.   Patented June 24, 1919.

Application filed December 15, 1918. Serial No. 267,253.

*To all whom it may concern:*

Be it known that I, JOHN MINOR KROYER, a citizen of the United States of America, residing at Stockton, in the county of San Joaquin, State of California, have invented certain new and useful Improvements in Combination Tractor Frames and Transmission-Housings; and I do declare the following to be a clear, full, and exact description of the same, reference being had to the accompanying drawings, and to the characters of reference marked thereon, which form a part of this application.

This invention relates to improvements in tractors particularly of that type shown in my pending application for tractors, filed May 6, 1918, Serial No. 232,703, and also in my pending application for tractors filed Oct. 21, 1918, Serial No. 258,971.

In any tractor and especially in those of the latter type it is highly essential to have a strong rigid frame and also to have all the transmission elements, such as gears, chains and the like, housed in so as to be free from dirt, dust, grit and moisture. In my type of tractor, one pair of the tractor wheels is driven by means of an internal gear and pinion driven by suitable transmission gearing from the power unit of the tractor. These two wheels are in turn connected in driving relation with the other pair of wheels by means of chains and sprockets. The sprockets are of the same diameter so that the two sides of the chains extend parallel with each other. The object of the present invention is to inclose each set of these gears, pinions, sprockets and chains within a common housing, which housing is in turn a component part of the frame of the tractor. By this, I accomplish the double purpose of protecting the moving parts and strengthening the frame. Further, a very compact structure is attained and lubricant can be introduced into the chain housing for keeping the same thoroughly lubricated at all times.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of the tractor.

Fig. 2 is an enlarged sectional view taken on a line 2—2 of Fig. 1.

Fig. 3 is a sectional view of the hollow frame adjacent one of the front wheel hubs and axles.

Referring now more particularly to the characters of reference on the drawings, the side members of the tractor frame each comprise two channel shaped members 1 and 2. These have their open sides together to form a housing chamber 3. The members 1 and 2 are fastened together in any suitable manner but preferably by means of flanges 4 and rivets 5. Or, if found practicable, the hollow member 1—2 may be cast or molded in one piece.

The rigid axles 6 and 7 are secured transversely through the hollow frame members 1—2 and held in suitable strong brackets 8 fixed to said members 1—2.

The rear wheels 9 are those wheels which are to be connected in driving relation with the power unit of the tractor. To this end, the outer face of each wheel is provided with an inclosing web 10 having a central orifice 11 to be covered by a cap 12 and another inlet orifice 13 to be covered by a plate 14. The web 10 near the periphery of the wheel 9 has an inwardly projecting annular flange 15 to which is secured the internal gear 16. The said web 10 adjacent the orifice 11 is provided with a hub 17. This hub 17 is mounted on bearings 18 and 19 on the axle 6. Said hub 17 extends a distance beyond the plane of the inner edge of the wheel 9 to permit it to project into the housing members 1—2. Here it is provided with a sprocket 20. The housing 1—2 is of course orificed as at 21 to admit of the reception of the hub and sprocket into the chamber 3. An inclosing collar 22 is arranged around the orifice 21 and is connected with an annular plate 23 which in turn has an annular flange 24 on its outer edge which projects over and incloses the gear 16, with a packing ring 25 between the two to make a dirt tight joint.

The front wheels 26 are of similar construction, excepting that the annular gear and pinion are omitted. These wheels have a hub 27 projecting into the housing chamber 3 through an orifice 28 provided therein. This orifice is closed against dirt or oil by means of a ring 29 secured over the said orifice, which ring is adapted to hold a packing member 30 which impinges against the hub 27. On the end of the hub which projects into the chamber 3 is secured a sprocket wheel 31, of the same size as the wheel 20, the sprocket wheels on each pair of corresponding wheels 9 and 26 being connected by a drive chain 32, whereby each pair of wheels on a side are maintained in constant driving relation with each other.

The frames 1—2 as will be readily discernible serve the double function of forming a strong reinforced supporting structure for the tractor, which is very essential in this type of machine, and further serve as housings for the driving chains. By filling the trough of the chamber 3 with oil, the chains will be automatically lubricated. The further inclosing of the driving gears and hubs of the wheels positively prevents dirt or grit reaching the working parts.

Thus, from the foregoing description it will readily be seen that I have produced such a device as substantially fulfils the objects of the invention as set forth herein.

While this specification set forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. The combination with a tractor having front and rear wheels connected in driving relation with each other by power transmission means, of hollow members forming the sides of the frame of the tractor, the transmission means being inclosed in the hollow members.

2. A tractor comprising a frame having hollow side members, rigid axles extending transversely through the hollow members, wheels mounted on the axles and having hubs projecting into the hollow members, and transmission means connecting the hubs of the wheels on each side of the tractor in driving relation with each other, such transmission means being inclosed within the hollow members.

3. A tractor comprising a frame having hollow side members, rigid axles extending transversely through the hollow members, wheels mounted on the axles and having hubs projecting into the hollow members, sprockets fixed to each hub within the hollow members and chains connecting each pair of sprockets within the hollow members on each side of the tractor, the chains being inclosed within the hollow members.

4. A tractor comprising a frame having hollow side members, the wheels of the tractor having their hubs projecting into the hollow members, and transmission means within the hollow members connecting the wheels on each side of the tractor in driving relation with each other.

In testimony whereof I affix my signature in presence of two witnesses.

JOHN MINOR KROYER.

Witnesses:
BERNARD PRIVAT,
FRANK H. CARTER.